US010450724B2

United States Patent
Hayashibe

(10) Patent No.: US 10,450,724 B2
(45) Date of Patent: Oct. 22, 2019

(54) WORK VEHICLE COLLECTIVE SWITCH APPARATUS AND WORK VEHICLE EQUIPPED WITH COLLECTIVE SWITCH APPARATUS

(71) Applicant: Komatsu Ltd., Tokyo (JP)

(72) Inventor: Taiichiro Hayashibe, Tokyo (JP)

(73) Assignee: Komatsu Ltd., Tokyo (JP)

( * ) Notice: Subject to any disclaimer, the term of this patent is extended or adjusted under 35 U.S.C. 154(b) by 99 days.

(21) Appl. No.: 15/743,876

(22) PCT Filed: Sep. 27, 2017

(86) PCT No.: PCT/JP2017/035031
§ 371 (c)(1),
(2) Date: Jan. 11, 2018

(87) PCT Pub. No.: WO2019/064387
PCT Pub. Date: Apr. 4, 2019

(65) Prior Publication Data
US 2019/0093316 A1 Mar. 28, 2019

(51) Int. Cl.
*E02F 9/20* (2006.01)
*B60Q 1/00* (2006.01)
(Continued)

(52) U.S. Cl.
CPC .......... *E02F 9/2095* (2013.01); *B60Q 1/0076* (2013.01); *B60R 16/03* (2013.01);
(Continued)

(58) Field of Classification Search
CPC .. F16H 61/4017; F16H 61/438; F16H 61/431; F16H 61/433; B60R 16/03;
(Continued)

(56) References Cited

U.S. PATENT DOCUMENTS

| 5,153,488 A | * | 10/1992 | Ruoff | B60S 1/0896 |
| | | | | 318/444 |
| 2005/0093508 A1 | * | 5/2005 | Taniguchi | H02J 7/1423 |
| | | | | 320/104 |

(Continued)

FOREIGN PATENT DOCUMENTS

DE 19505845 A1 9/1995
DE 102015112201 A1 2/2017
(Continued)

OTHER PUBLICATIONS

Mitsutake Ryoji, "Advanced Wheel Loader (Saishingata hoiiru rooda, published in Japanese)", Journal of Japan Construction Machinery and Construction Association (JCMA), vol. 69 No. 1, Jan. 2017 pp. 14-18 and English translation of the relevant portion thereof. (discussed in the spec).
(Continued)

Primary Examiner — Behrang Badii
(74) Attorney, Agent, or Firm — Locke Lord LLP

(57) ABSTRACT

A work vehicle collective switch apparatus includes: a switch operation unit including a plurality of switches; a network side signal output unit that outputs a switch state signal to an in-vehicle network side connected to the collective switch apparatus; a drive signal output unit that outputs a drive signal to a direct-coupled device connected to the collective switch apparatus, and a control unit that outputs a command signal corresponding to switch operation on a basis of switch assignment information that assigns in advance as to whether the drive signal is to be output from the drive signal output unit or the switch state signal is to be output from the network side signal output unit in accordance with switch operation of any of the plurality of switches.

7 Claims, 9 Drawing Sheets

(51) Int. Cl.
| | |
|---|---|
| *B60R 16/03* | (2006.01) |
| *E02F 3/43* | (2006.01) |
| *F16H 61/431* | (2010.01) |
| *F16H 61/433* | (2010.01) |
| *F16H 61/4017* | (2010.01) |
| *B60K 6/08* | (2006.01) |
| *H02J 7/00* | (2006.01) |
| *B60R 16/02* | (2006.01) |
| *H02J 7/14* | (2006.01) |
| *E02F 3/34* | (2006.01) |

(52) U.S. Cl.
CPC ............ *E02F 3/434* (2013.01); *E02F 9/2004* (2013.01); *E02F 9/2012* (2013.01); *E02F 9/2058* (2013.01); *B60K 6/08* (2013.01); *B60R 16/02* (2013.01); *E02F 3/34* (2013.01); *F16H 61/4017* (2013.01); *F16H 61/431* (2013.01); *F16H 61/433* (2013.01); *H02J 7/00* (2013.01); *H02J 7/1423* (2013.01)

(58) Field of Classification Search
CPC ..... B60R 16/02; H02M 3/1582; H02M 5/275; H02M 3/33561; H02M 5/225; H02M 7/797; H02M 7/4807; H02M 5/293; H02M 5/297; H02M 5/458; H02M 3/33592; H02M 3/33546; H03K 5/003; H03K 17/687; H03K 5/08; E02F 9/2095; E02F 3/434; E02F 9/2004; E02F 9/2012; E02F 9/2058; E02F 3/34; H02J 7/00; H02J 7/1423; H03M 1/002; H03M 1/682; H03M 1/66; H03M 1/0609; H03M 1/664; H03M 1/0607; H03F 1/0227; H03F 1/3205; H03F 1/0222; H03F 1/025; H03F 1/32; H03F 1/56; H03F 3/195; H03F 3/245; B60Q 1/0076; B60K 6/08
See application file for complete search history.

(56) References Cited

U.S. PATENT DOCUMENTS

| | | |
|---|---|---|
| 2007/0156280 A1 | 7/2007 | Morath |
| 2008/0013351 A1* | 1/2008 | Alexander .......... H02M 3/1582 363/123 |
| 2011/0292697 A1* | 12/2011 | Alexander ............ H02M 5/275 363/37 |
| 2012/0152641 A1* | 6/2012 | Takahashi ........... F16H 61/4017 180/307 |
| 2016/0055688 A1 | 2/2016 | Miura et al. |
| 2017/0107693 A1 | 4/2017 | Yamada |

FOREIGN PATENT DOCUMENTS

| | | |
|---|---|---|
| EP | 1586712 A2 | 10/2005 |
| JP | 04-179011 A | 6/1992 |
| JP | 08-034299 A | 2/1996 |
| JP | 2000-299890 A | 10/2000 |
| JP | 5111184 B2 | 12/2012 |
| JP | 2016-077215 A | 5/2016 |
| WO | 2014/122711 A1 | 8/2014 |
| WO | 2015/045910 A1 | 4/2015 |

OTHER PUBLICATIONS

International Search Report and Written Opinion dated Jan. 9, 2018, issued for PCT/JP2017/035031.

Extended European Search Report dated Feb. 19, 2019, issued for the European patent application No. 17825713.5.

* cited by examiner

FIG.7

| SWITCH | OUTPUT OF DRIVE SIGNAL | OUTPUT OF SWITCH STATE SIGNAL TO NETWORK SIDE |
|---|---|---|
| SW1 | ○ | ○ |
| SW2 | ○ | ○ |
| SW3 | × | ○ |
| SW4 | × | ○ |
| SW5 | × | ○ |
| SW6 | × | ○ |
| SW7 | ○ | ○ |
| SW8 | ○ | × |
| SW9 | × | ○ |
| SW10 | × | ○ |
| SW11 | × | ○ |
| SW12 | × | ○ |

…

WORK VEHICLE COLLECTIVE SWITCH APPARATUS AND WORK VEHICLE EQUIPPED WITH COLLECTIVE SWITCH APPARATUS

FIELD

The present disclosure relates to a collective switch apparatus provided with a plurality of switches, and a work vehicle including the collective switch apparatus.

BACKGROUND

In the related art, a work vehicle such as a wheel loader includes, in a driving room, a large number of switches for performing various types of operations, and a signal corresponding to the operation of the switch is transmitted to a vehicle body controller or the like, via an in-vehicle network. Recently, in work vehicles, functions have been expanded and the number of functions has been increased than before, so that the number of the switched to be operated by an operator or a service person has been increased and the function assignment to the switches has been complicated. In addition, it is desired that a large number of switches be arranged within a limited space near the driver seat.

Non-patent document 1 discloses a wheel loader including, in its driving room, a collective switch apparatus in which a group of switches, which are to be used frequency, is collectively arranged.

CITATION LIST

Patent Literature

[Non-Patent Literature 1] "Advanced Wheel Loader (Saishingata hoiiru rooda, published in Japanese)" by Mitsutake Ryoji, Journal of Japan Construction Machinery and Construction Association (JCMA), Vol. 69 No. 1 January 2017 pp. 14-18

SUMMARY

Technical Problem

When, however, all the signals corresponding to individual switch operations of the collective switch apparatus are output to the vehicle body controller via the in-vehicle network, a load to the vehicle body controller, which executes processing for the signal corresponding to each of the switch operation, will increase. In order to correspond to the increased load on the vehicle body controller, it is desired to mount a high-performance vehicle body controller having high processing capability and high heat resistance, which would cause an increase of cost. Meanwhile, a certain device mounted on a work vehicle may be operated by receiving a drive signal by switch operation on the collective switch apparatus without interposing the vehicle body controller.

The present disclosure has been made in view of the above, and there is a need for providing a work vehicle collective switch apparatus capable of executing various functions with a simple configuration while reducing the load to a vehicle body controller, and a work vehicle equipped with the collective switch apparatus.

Solution to Problem

A work vehicle collective switch apparatus includes: a switch operation unit including a plurality of switches; a network side signal output unit that outputs a switch state signal to an in-vehicle network side connected to the collective switch apparatus; a drive signal output unit that outputs a drive signal to a direct-coupled device connected to the collective switch apparatus, and a control unit that outputs a command signal corresponding to switch operation on a basis of switch assignment information that assigns in advance as to whether the drive signal is to be output from the drive signal output unit or the switch state signal is to be output from the network side signal output unit in accordance with switch operation of any of the plurality of switches.

Advantageous Effects of Invention

According to the present disclosure, there are provided: a switch operation unit having a plurality of switches; a network side signal output unit that outputs a switch state signal to an in-vehicle network side connected to the collective switch apparatus; and a drive signal output unit that outputs a drive signal to a direct-coupled device connected to the collective switch apparatus, in which a control unit outputs a command signal corresponding to switch operation on a basis of switch assignment information that assigns in advance as to whether the drive signal is to be output from the drive signal output unit or the switch state signal is to be output from the network side signal output unit in accordance with switch operation of any of the plurality of switches. With this configuration, the switch to the direct-coupled device can be provided even with the increased number of switches, making it possible to reduce the load on the vehicle body controller and execute various functions.

BRIEF DESCRIPTION OF DRAWINGS

FIG. 7 is a diagram illustrating an exemplary switch assignment information.

DESCRIPTION OF EMBODIMENTS

In the following, an embodiment for implementing the present disclosure will be described with reference to the accompanying drawings. In the present disclosure, a wheel loader will be described as an example of a work vehicle.

(Overall Configuration of Work Vehicle)

Figure 1:
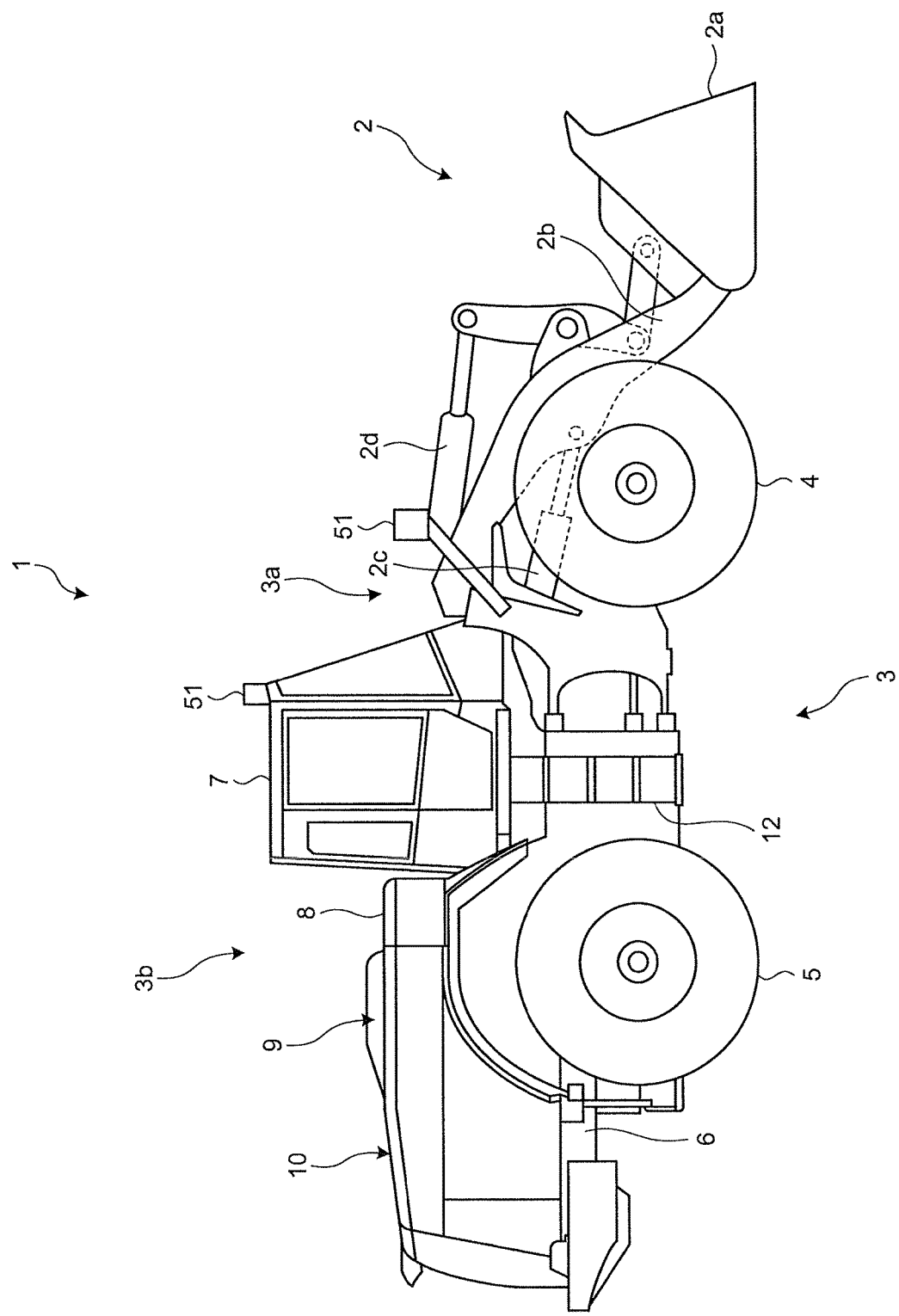
FIG. 1 is a right side view illustrating an overall configuration of a wheel loader as an exemplary work vehicle according to an embodiment of the present disclosure.

FIG. 1 is a right side view illustrating an overall configuration of a wheel loader 1 as an example according to an embodiment of the present disclosure. In the following description, the terms "front" and "rear" refer to the front and rear of a vehicle body 3, respectively. That is, the right direction of FIG. 1 corresponds to "front" and the left direction corresponds to "rear". Moreover, in the following description, the terms "right", "left", "upper", and "lower" are based on the direction in which the driver looks forward from the driving room.

As illustrated in FIG. 1, the wheel loader 1 includes a work machine 2, the vehicle body 3, a front wheel 4, and a rear wheel 5. The wheel loader 1 is self-propelled by the rotational drive of the front wheel 4 and the rear wheel 5, and performs desired work using the work machine 2.

The work machine 2 is a mechanism driven by hydraulic oil pressurized by a hydraulic pump (not illustrated) and is arranged in front of the vehicle body 3. The work machine 2 includes a bucket 2a, a boom 2b, a boom cylinder 2c, and a bucket cylinder 2d. The bucket 2a is attached to the tip of the boom 2b. The bucket 2a is lifted with the ascent of the boom 2b, while the boom 2b is attached to a front portion of a front vehicle body 3a to be described below. The boom cylinder 2c drives the boom 2b by pressure oil ejected from the hydraulic pump. The bucket cylinder 2d drives the bucket 2a by the pressure oil ejected from the hydraulic pump.

The vehicle body 3 includes a front vehicle body 3a and a rear vehicle body 3b. The front vehicle body 3a and the rear vehicle body 3b are coupled to each other so as to be swingable in the left-right direction. The work machine 2 and the front wheel 4 are provided on the front vehicle body 3a, while the rear wheel 5 is provided on the rear vehicle body 3b.

The rear vehicle body 3b includes a rear frame 6, a cab 7, a hydraulic oil tank 8, an engine room 9, and a cooling chamber 10. The rear frame 6 is a frame constituting a framework of the rear vehicle body 3b and supports the rear wheel 5, the cab 7, the hydraulic oil tank 8, an engine in the engine room 9, a cooling unit in the cooling chamber 10, or the like.

The cab 7 internally includes a driving room, and various operation members and operation panels. The hydraulic oil tank 8 stores hydraulic oil for driving the work machine 2, or the like, and the hydraulic oil is supplied to the work machine 2, or the like, by a hydraulic pump. While the work vehicle according to the present embodiment is equipped with the cab 7 including a driving room in which a driver seat 20 is surrounded by glass and pillars, the work vehicle may equipped with a canopy-type cab without using glass.

On the right side of the cab 7, a ladder 12 is provided on the cab 7 for the entry and exit of the operator. The ladder 12 is fixed to the rear frame 6 and extends from a lower end portion of the cab 7 to the vicinity of the ground. A front work lamp 51 is provided at a portion above the cab 7, or the like, for brightly illuminating the front in occasions such as nighttime operation.

Outline of Driving Room Interior

Figure 2:
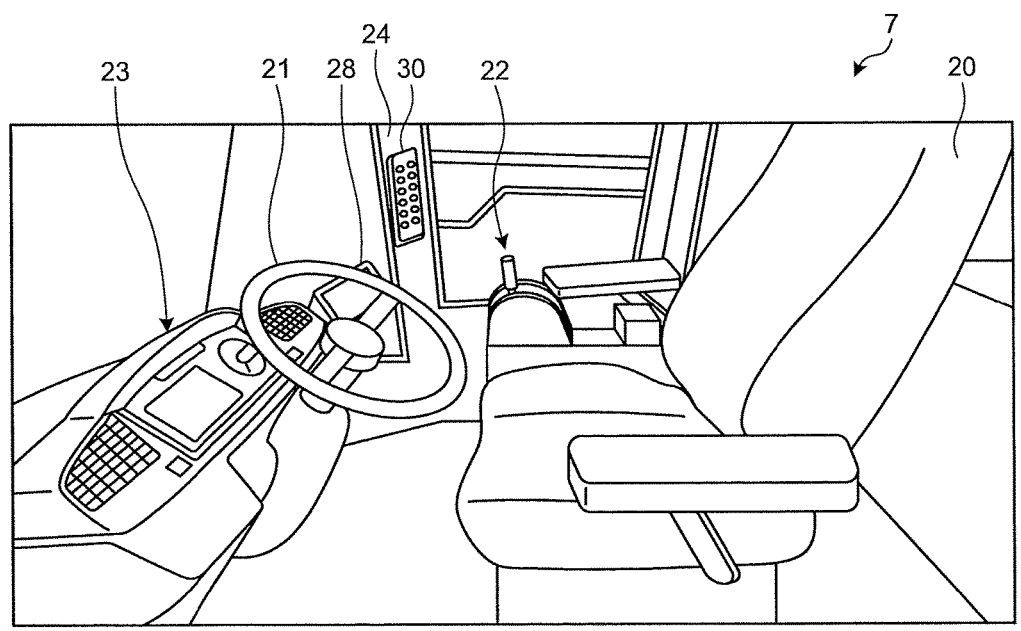
FIG. 2 is a diagram illustrating an exemplary device arrangement state in a driving room of a cab.

FIG. 2 is a diagram illustrating an exemplary device arrangement state in the driving room of the cab 7. As illustrated in FIG. 2, the driver seat 20 is arranged in the driving room. A steering wheel 21 is arranged on the front surface of the driver seat 20, and a console 23 is arranged on the front surface thereof. A rear-view monitor 28 is arranged on the right side of the console 23. The rear-view monitor 28 displays a rearward image of the wheel loader 1, for example. In addition, a work machine lever 22 is arranged on the right side of the driver seat 20. Furthermore, a collective switch apparatus 30 is arranged on a pillar 24 being one of the constituent members of the cab 7, for example. The work machine lever 22 is a lever for operating the bucket 2a and the boom 2b.

Figure 3:
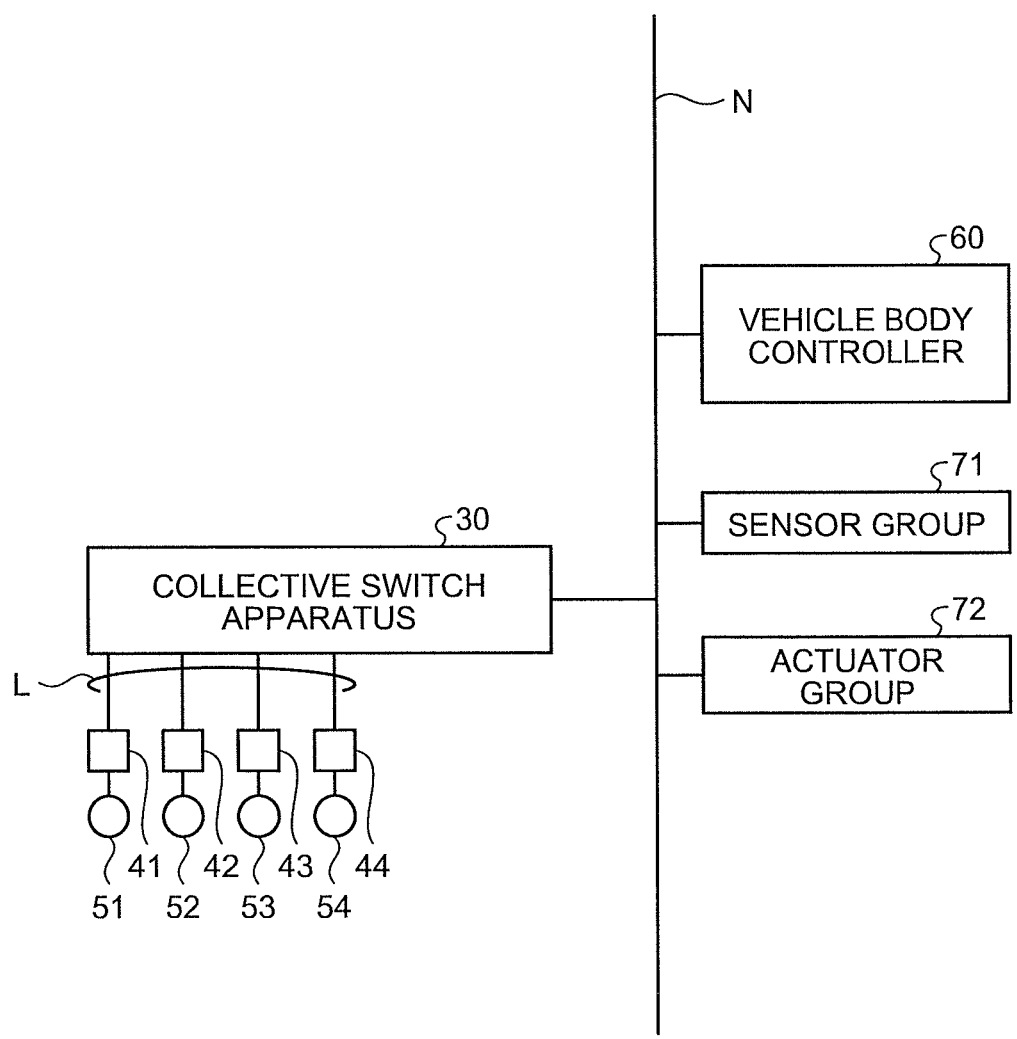
FIG. 3 is a block diagram illustrating an exemplary internal configuration of a work vehicle having a collective switch apparatus as a center.

FIG. 3 is a block diagram illustrating an exemplary internal configuration of a work vehicle having the above-described collective switch apparatus 30 as a center. The collective switch apparatus 30, a vehicle body controller 60, a sensor group 71, and an actuator group 72 are connected to an in-vehicle network N such as a CAN. The vehicle body controller 60 is a controller that controls an inclination angle of a swash plate of a swash plate-type hydraulic pump driven by a drive unit in a vehicle body, for example, by an engine. The sensor group 71 includes an engine rotation sensor and a vehicle speed sensor. The collective switch apparatus 30 includes a plurality of switches and is connected to the vehicle body controller 60 via the in-vehicle network N, while being connected to predetermined direct-coupled devices 51 to 54 via relay switches 41 to 44, respectively. Examples of the direct-coupled devices 51 to 54 include a front work lamp 51 and a rear work lamp as a work lamp, a fog lamp, or a rotating lamp (not illustrated) as a warning lamp and an auxiliary lamp. The rotating lamp and the fog lamp are installed above the cab 7, for example. The rear work lamp is arranged at an outer rear end of the cooling chamber 10, for example.

(Exterior Configuration of Collective Switch Apparatus)

Figure 4:
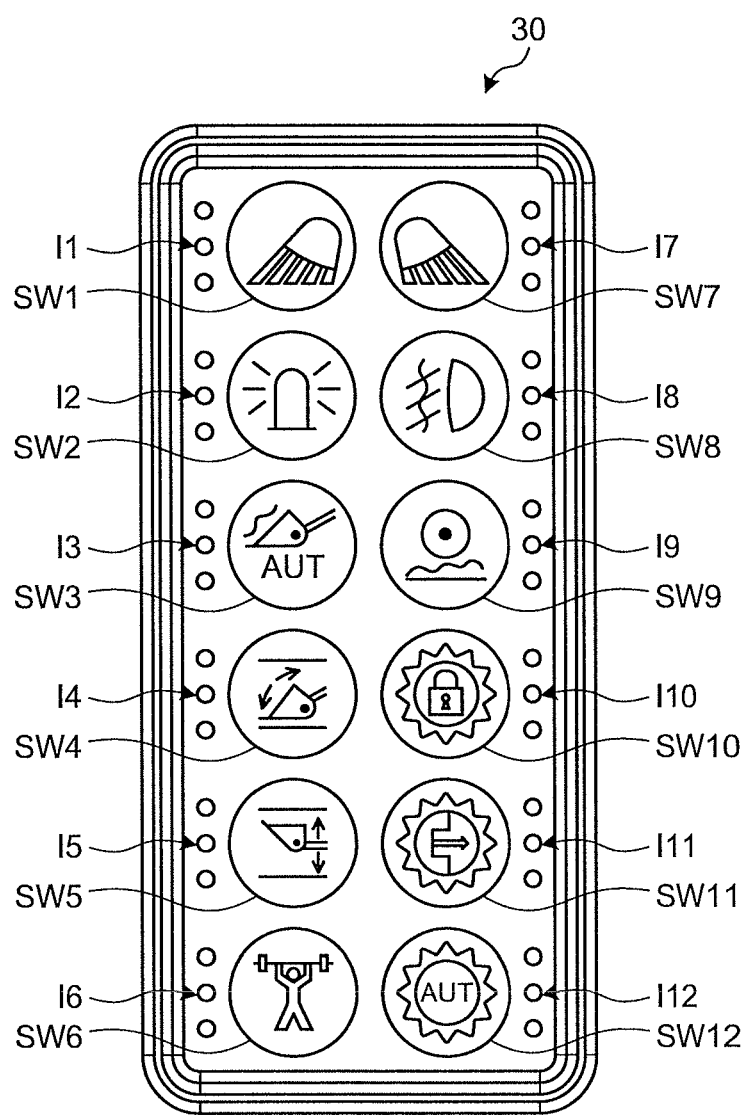
FIG. 4 is a plan view illustrating an exemplary structure of the collective switch apparatus.
Figure 5:
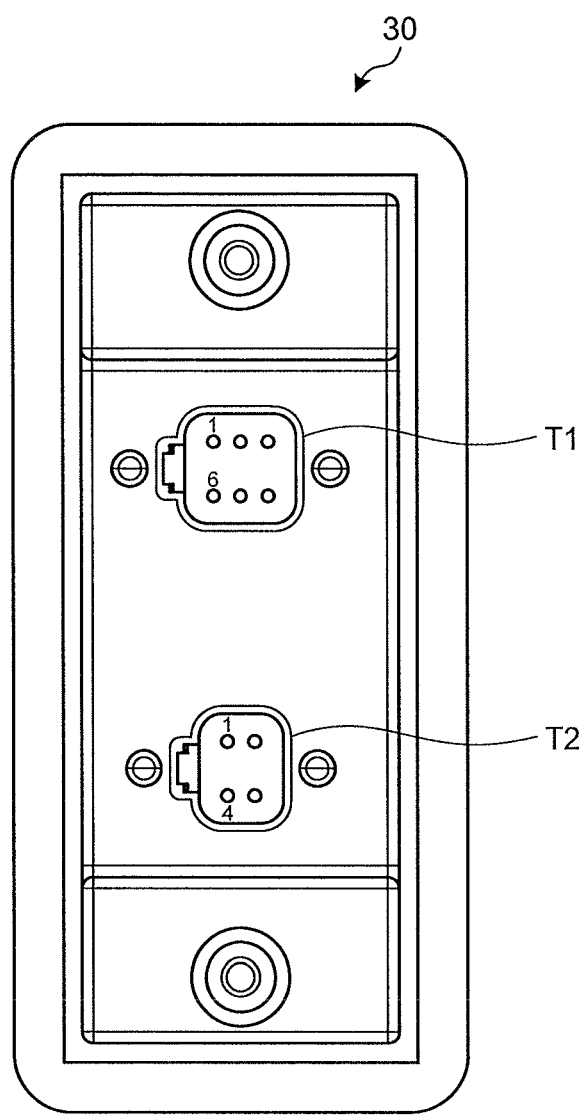
FIG. 5 is a rear view illustrating an exemplary structure of the collective switch apparatus.

FIG. 4 is a plan view illustrating an exemplary structure of the collective switch apparatus 30. FIG. 5 is a rear view illustrating an exemplary structure of the collective switch apparatus 30. As illustrated in FIG. 4, a plurality of switches SW1 to SW12 is provided on the front side of the collective switch apparatus 30. Moreover, there provided are indicators I1 to I12 formed with LEDs indicating operation states of functions assigned to the corresponding switches SW1 to SW12 on the outer edge side of each of the switches SW1 to SW12, that is, at positions along the outer edge of the long side of the outer shape of the collective switch apparatus 30 as viewed from the front side as illustrated in FIG. 4.

As illustrated in FIG. 5, the rear side of the collective switch apparatus 30 includes a connector T1 connecting a signal line L to each of the relay switches 41 to 44 that activate functions of the respective direct-coupled devices 51 to 54 as well as connecting the in-vehicle network N, and includes a connector T2 connected to power supply.

Specifically, the switch SW1 is a switch that turns on and off the front work lamp 51 (direct-coupled device 51) that illuminates a front work area of the wheel loader 1 provided at the upper front portion of the cab 7. The switch SW2 is a switch for turning on and off a rotating lamp (direct-coupled device 52) for informing the outside of a predetermined state by a color of red or yellow.

The switches SW3, SW4, and SW5 are, for example, switches for turning on and off the respective functions for automatically controlling the work machine 2. The switch SW6 is a switch for selecting whether to set the engine output mode to a power (P) mode or an economy (E) mode. The E mode is a mode of suppressing fuel consumption during normal work, while the P mode is a mode capable of achieving the maximum output at the time of working with a large work amount. The switch SW6 is a switch for executing a work capacity change function.

The switch SW7 is a switch for turning on and off the rear work lamp (direct-coupled device 53) (not illustrated) that illuminates a rear work area of the wheel loader 1. The switch SW8 is a switch that turns on and off the fog lamp (direct-coupled device 54). In short, each of the switches SW1, SW2, SW7, and SW8 is a switch that functions (turning on and off) any of the direct-coupled devices 51 to 54 being the lighting device system of the wheel loader 1.

Although a description of the function of each of the switches SW9 to SW12 is herein omitted, each of the switches provided in the collective switch apparatus 30 has not been assigned to have any function that is to be urgently needed in a state where the operator performs excavation loading work by operating the work machine lever 22 for moving the work machine 2 and in a state where the operator performs traveling work by operating an accelerator, a brake, and the steering wheel 21 (not illustrated). Each of the switches provided in the collective switch apparatus 30 is a switch operated arbitrarily in accordance with a result of determination that it is a function needed by the operator at that time in a state where the wheel loader 1 is stopped. In other words, functions that are executed by operating the switches provided in the collective switch apparatus 30 are the functions assigned as the functions not demanding promptness or urgency. Note that the number of switches provided in the collective switch apparatus 30 need not be twelve as an example in the present embodiment, and the number may be larger or smaller than this number.

Note that, however, it is possible to assign a function demanding promptness or urgency as the function to be executed by operating the switch provided in the collective switch apparatus 30. For example, it is possible to configure such that, by operating any of the switches SW to urgently stop the work vehicle, a drive signal is output to a relay switch that shuts off a power supply line of a battery (not illustrated), and then the relay switch is driven to stop the work vehicle. Alternatively, it is possible to configure such that, by operating any of the switches SW to urgently stop the work vehicle, a switch state signal is transmitted to the vehicle body controller 60 via the in-vehicle network N, and, then, the vehicle body controller 60 stops fuel injection from a fuel injection apparatus (not illustrated) to the engine so as to stop the work vehicle.

Control Configuration of Collective Switch Apparatus

Figure 6:
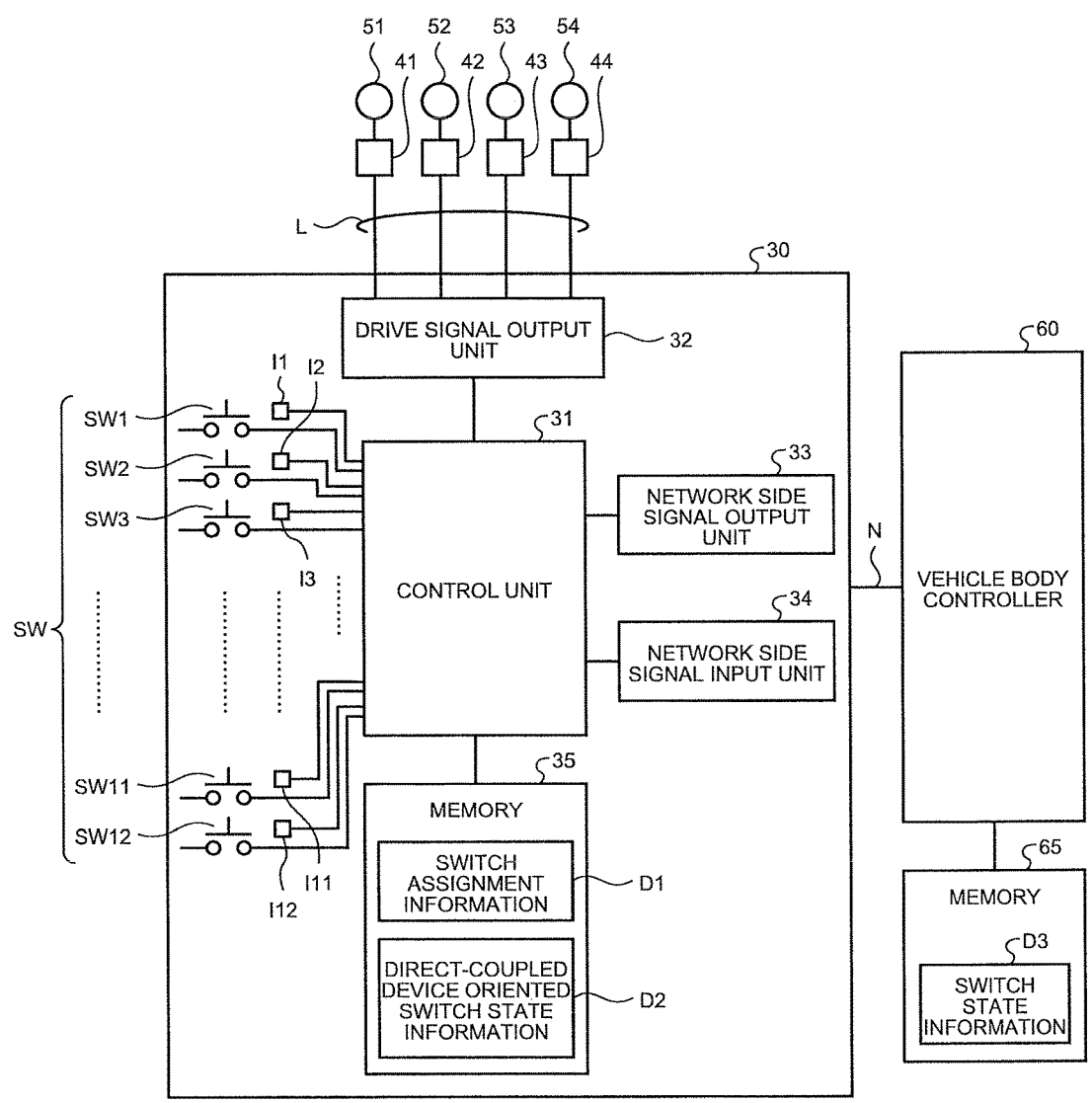
FIG. 6 is a block diagram illustrating a control configuration of a collective switch apparatus and a connection configuration to outside.

FIG. 6 is a block diagram illustrating a control configuration of the collective switch apparatus 30 and a connection configuration to outside. As illustrated in FIG. 6, the collective switch apparatus 30 includes a control unit 31, a drive signal output unit 32, a network side signal output unit 33, a network side signal input unit 34, a memory 35, a switch operation unit SW (switches SW1 to SW12), and the indicators I1 to I12. The control unit 31 is connected to the drive signal output unit 32, the network side signal output unit 33, the network side signal input unit 34, the memory 35, the switch operation unit SW, and the indicators I1 to I12. The drive signal output unit 32 is connected to the signal line L that connects each of the direct-coupled devices 51 to 54 via the relay switches 41 to 44, respectively. The in-vehicle network N is connected to the network side signal output unit 33 and the network side signal input unit 34.

For example, a microcomputer may be used as the control unit 31. The control unit 31 reads information stored or retained in the memory 35 and causes the indicators I1 to I12 to be lit or blink in accordance with the operation of the switch operation unit SW. Moreover, the control unit 31 determines whether the switch operation unit SW has been operated, or determines which switch operation unit SW has been operated, and outputs a command signal to the drive signal output unit 32 or the network side signal output unit 33.

The drive signal output unit 32 outputs a drive signal that turns on and off each of the relay switches 41 to 44 on a basis of the command signal received from the control unit 31.

The drive signal output unit 32 generates a drive signal corresponding to the operation of the switch operation unit SW toward the direct-coupled devices 51 to 54. The drive signal is a voltage signal applied to a solenoid of the relay switches 41 to 44, for example. Accordingly, the drive signal output unit 32 generates this voltage signal. Note that the drive signal may be a control signal that drives the relay switches 41 to 44.

On the basis of the command signal received from the control unit 31, the network side signal output unit 33 outputs the switch state signal corresponding to the operation other than the operation of the switch operation unit SW toward the direct-coupled devices 51 to 54 to the vehicle body controller 60 via the in-vehicle network N.

The network side signal input unit 34 receives the signal input from the in-vehicle network N and inputs a command signal into the control unit 31. The command signal based on the signal input from the in-vehicle network N includes a control signal for driving and operating the direct-coupled devices 51 to 54 and a control signal for updating various types of setting information in the collective switch apparatus 30.

The memory 35 stores or retains switch assignment information D1 and direct-coupled device oriented switch state information D2. As illustrated in FIG. 7, the switch assignment information D1 stores and sets, with respect to each of the switches SW1 to SW12 in advance, information indicating whether to validate outputting the drive signal for activating the functions of the direct-coupled devices 51 to 54 from the drive signal output unit 32 and information indicating whether to validate outputting the switch state signal from the network side signal output unit 33 via the in-vehicle network N. In FIG. 7, the circle marks indicate validity, and the cross marks indicate invalidity.

Note that the switch assignment information D1 illustrated in FIG. 7 is an example only, in which outputting the drive signal is validated for the switches SW1, SW2, SW7, and SW8, while outputting the switch state signal to the network side is validated for all the switches (switches SW1 to SW7 and the switches SW9 to SW12) except the switch SW8. Alternatively, the switch state signal output to the network side may be validated toward solely the switches SW3 to SW6 and SW9 to SW12 for which the drive signal output is invalidated. While outputting the switch state signal to the network side may be invalidated for the switches SW1, SW2, and SW7, validating all the switches would simplify the processing control of the control unit 31 and the network side signal output unit 33 and make the setting processing easy because there would be no need to change the setting every time the switch assignment of the drive signal output is changed. Note that outputting the switch state signal to the network side together with the output of the drive signal would not cause any problem in the output of the drive signal, and the vehicle body controller 60 updates switch state information D3 in a memory 65 connected to the vehicle body controller 60 on the basis of the transmitted switch state signal.

The direct-coupled device oriented switch state information D2 retains the current operation state of each of the switches SW1, SW2, SW7, and SW8, which are the switches oriented toward the direct-coupled devices. Retention of this information may use a flip-flop circuit or information may be updated by software. The switch state information D3 in the memory 65 connected to the vehicle body controller 60 retains the updated current operation states of all the switches SW1 to SW12. Retention of this information may also use a flip-flop circuit or information may be updated by software.

The indicators I1 to I12 may use LEDs or the like, and the current operation state of the function corresponding to the operation on the switches SW1 to SW12 is displayed by causing the LEDs to be lit or blink.

In the present embodiment, the switches SW1 to SW12 are position-retaining switches (alternate switches), for example. The switches SW1 to SW12 may be self-reset type switches (momentary switches). The switch operation unit SW to be used may be a membrane switch type, for example. The switch operation unit SW may also be a toggle switch, a push button switch, or a dial switch.

The collective switch apparatus 30 may use a graphical user interface (GUI) using a touch panel instead of the mechanical switches SW1 to SW12.

Switch Control Processing of Collective Switch Apparatus

Figure 8:
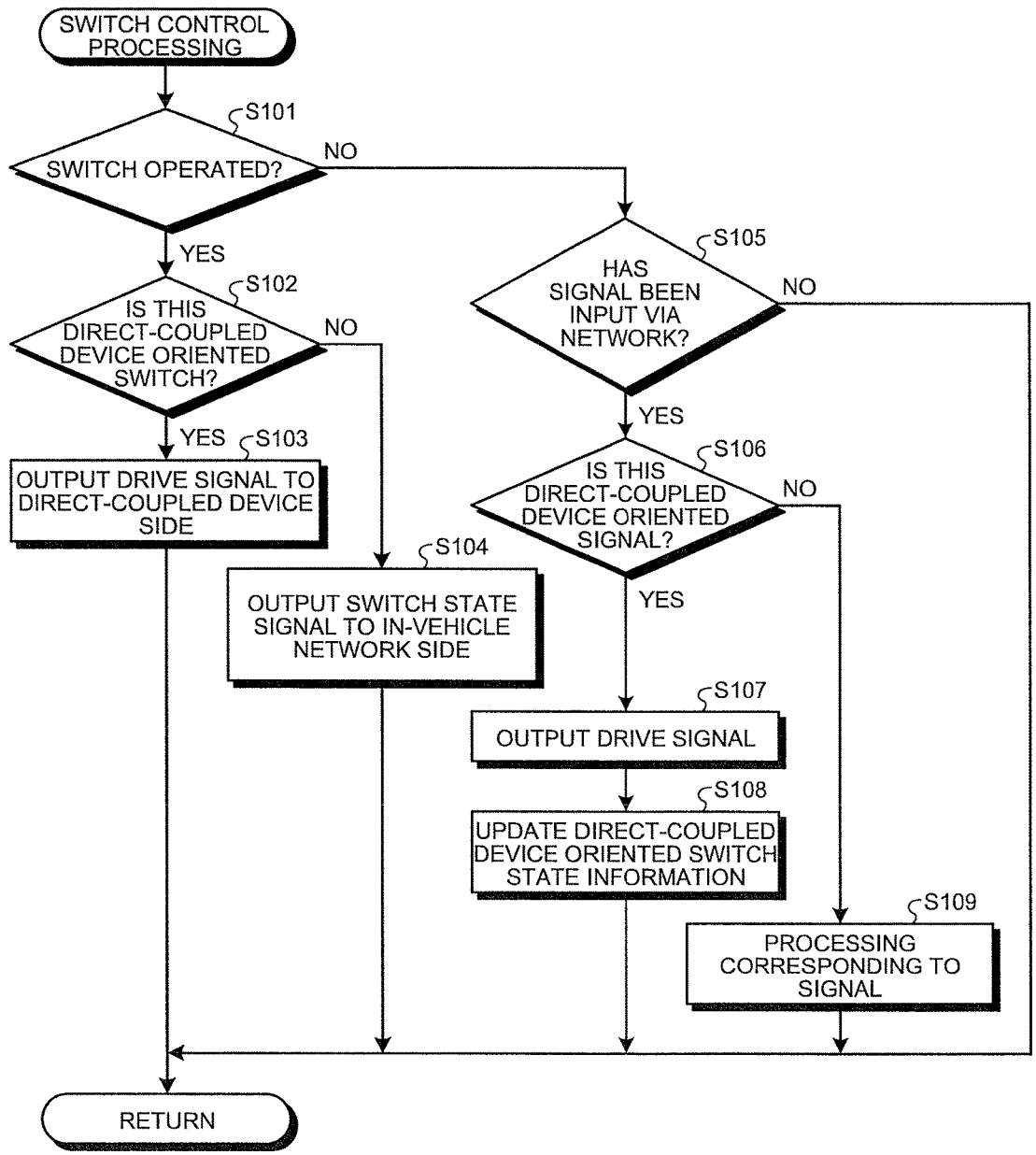
FIG. 8 is a flowchart illustrating an exemplary switch control processing procedure performed by the control unit.

Next, an example of switch control processing by the control unit 31 will be described with reference to the flowchart illustrated in FIG. 8. As illustrated in FIG. 8, the control unit 31 first determines whether the switches SW1 to SW12 have been operated (Step S101). In a case where any of the switches SW1 to SW12 has been operated (Step S101, Yes), it is further determined whether the operated switch of the switches SW1 to SW12 is included in the direct-coupled device oriented switches SW1, SW2, SW7 and SW8 (Step S102). This determination is performed by the control unit 31 by reading and referring to the switch assignment information D1 in the memory 35.

In a case where the operated switch of the switches SW1 to SW12 corresponds to any of the direct-coupled devices oriented switches SW1, SW2, SW7 and SW8 (Step S102, Yes), an on-off drive signal is output to the relay switches 41 to 44 of the direct-coupled devices 51 to 54 corresponding to the operated switches SW1, SW2, SW7, and SW8 from the drive signal output unit 32 (Step S103), and the procedure returns to repeat the above-described processing. The relationship between the direct-coupled devices 51 to 54 corresponding to the switches SW1, SW2, SW7 and SW8 is set in the memory 35 in advance as illustrated in FIG. 7. In this case, outputting the switch state signal from the network side signal output unit 33 is validated at least with respect to SW1, SW2, and SW7, and the switch state signal is output as dummy to the vehicle body controller 60 side.

In contrast, in a case where the operated switch of the switches SW1 to SW12 does not correspond to any of the direct-coupled device oriented switches SW1, SW2, SW7, and SW8 (Step S102, No), that is, in a case where the operated switch operation unit SW is the switch operation unit SW (SW3 to SW6, and SW9 to SW12) other than the direct-coupled device oriented switches SW1, SW2, SW7, and SW8, the switch state signal is output to the in-vehicle network N side (Step S104) and the procedure returns to repeat the above-described processing.

In a case where the switch operation unit SW has not been operated (Step S101, No), it is determined whether a command signal has been input into the network side signal input unit 34 (Step S105). In a case where the command signal has not been input into the network side signal input unit 34 (Step S105, No), the procedure returns to repeat the above-described processing.

In contrast, in a case where the command signal has been input into the network side signal input unit 34 (Step S105, Yes), it is further determined whether the command signal is a signal corresponding to any of the direct-coupled devices 51 to 54 (Step S106). In a case where it is a signal corresponding to any of the direct-coupled devices 51 to 54 (Step S106, Yes), a drive signal corresponding to any of the direct-coupled devices 51 to 54 is output from the drive signal output unit 32 (Step S107), and the control unit 31 updates the direct-coupled device oriented switch state information D2 in the memory 35 (Step S108), and thereafter, the procedure returns to repeat the above-described processing. In a case where it is not the command signal corresponding to the direct-coupled devices 51 to 54 (No in Step S106), the processing corresponding to the input signal is performed (Step S109), and thereafter, the procedure returns to repeat the above-described processing.

An exemplary case of outputting the drive signal of Step S107 includes a case where an acceleration sensor as one of the sensor group 71 detects abnormality where the vehicle body experiences an impact and the detected signal is transmitted to the vehicle body controller 60, and then, the vehicle body controller 60 turns on the rotating lamp connected to the collective switch apparatus 30 from the vehicle body controller 60 side. That is, the collective switch apparatus 30 can activate the function of the direct-coupled device connected to the collective switch apparatus 30 in response to not only an instruction by the operation from the operator but also an instruction from the vehicle body controller 60 side.

In a case where a wireless communication device is connected to the vehicle body controller 60 and wireless communication from outside is received, the vehicle body controller 60 may output a predetermined command signal to the network side signal input unit 34, and the control unit 31 may output a drive signal corresponding to the command signal to the drive signal output unit 32 so as to activate any of the relay switches 41 to 44 corresponding to the direct-coupled devices 51 to 54.

In addition, the following setting may be performed in advance on the vehicle body controller 60 as the setting for activating the relay switch corresponding to any of the direct devices in accordance with any switch operation on the switch operation unit SW. For example, the switch assignment information D1 is set so as to output solely the switch state signal in response to any switch operation and the vehicle body controller 60 is set so as to activate the relay switches 41 to 44 corresponding to any of the direct devices 51 to 54 corresponding to the switch that has been operated. That is, when the switch is operated, the switch state signal is transmitted to the vehicle body controller 60, and then, the vehicle body controller 60 determines whether to activate the relay switch (for example, the relay switch 41) of the direct device (for example, the direct-coupled device 51) set to operate in accordance with the operation of the switch. In a case where it is determined that it is allowable to activate the direct-coupled device 51 as a result of determination, the vehicle body controller 60 outputs a command signal instructing activation of the direct-coupled device 51 to the network side signal input unit 34. Upon receiving the command signal input into the network side signal input unit 34, the control unit 31 activates the relay switch 41 corresponding to the direct-coupled device 51 by outputting a drive signal to the drive signal output unit 32.

In this setting, the switch state signal is validated instead of being set as dummy. In other words, triggered by switch operation for operating any of the direct-coupled devices, the collective switch apparatus 30 outputs the drive signal for activating the direct device after receiving a determination from the vehicle body controller 60 that is a connected processing apparatus.

Plurality of Collective Switch Apparatuses

Figure 9:
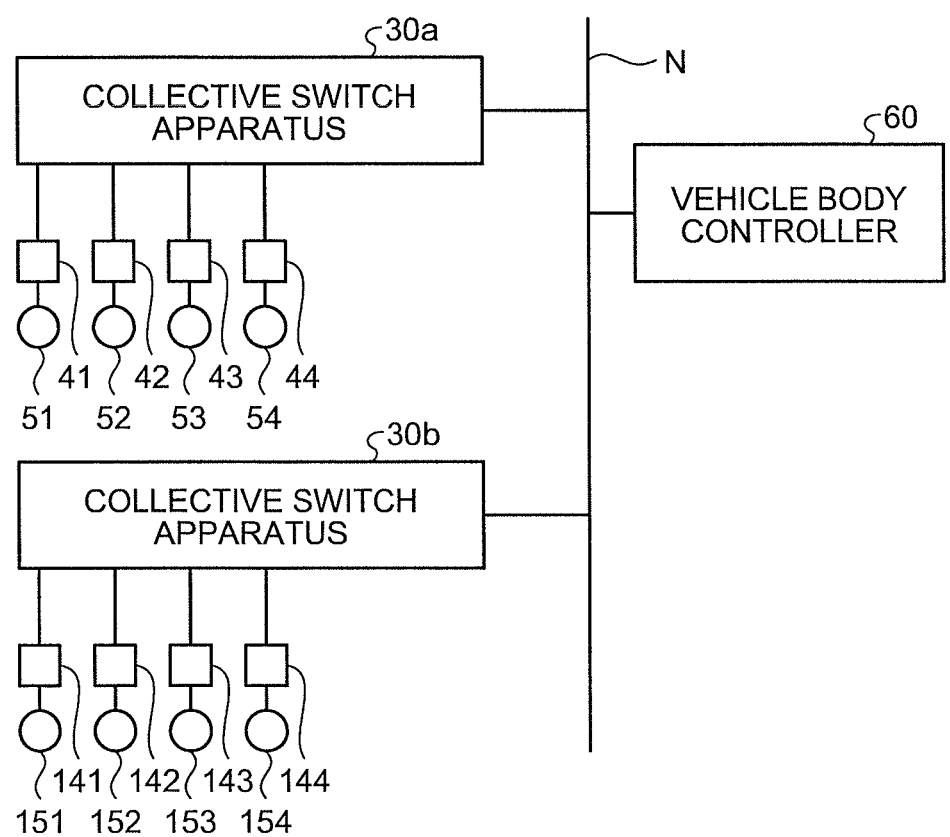
FIG. 9 is a block diagram illustrating an exemplary system configuration in which a plurality of collective switch apparatuses is connected to an in-vehicle network.

While the above-described embodiment is a case of one collective switch apparatus 30, it is also allowable, as illustrated in FIG. 9, to provide a system configuration including a plurality of the collective switch apparatuses (collective switch apparatuses 30a and 30b) being connected to the in-vehicle network N.

In this case, the collective switch apparatuses 30a and 30b may have the same configuration as the collective switch apparatus 30 and may perform switch operation for different direct-coupled devices, or alternatively, they may be collective switch apparatuses with different specifications with different number of switches and different number of direct-coupled devices to be connected. Note that the direct-coupled devices 51 to 54, and the direct-coupled devices 151 to 154 in FIG. 9 are different from each other.

Meanwhile, the above-described embodiment is a case where the switches SW1, SW2, SW7, and SW8 are the switches for activating the function of the lighting device system including the warning lamp, the auxiliary lamp, and the work lamp, while the switches SW3 to SW5 are the switches for activating the function of the automatic control of the work machine 2. The switches are classified into the switch which requires vehicle information and the switch which does not require such vehicle information. The vehicle information includes information related to the driving state of the engine and the hydraulic pump and the state information of the work machine system and the traveling system, detected by the vehicle body controller 60 from the sensor group 71. Accordingly, the switches SW1, SW2, SW7 and SW8 are assigned as a group of switches not needing vehicle information, and the switches SW3 to SW6 and SW9 to SW12 are assigned as a group of switches needing vehicle information. In addition, the switches SW1, SW2, SW7, and SW8 are configured such that vehicle information is not needed by the direct-coupled device that executes the corresponding function, and thus, the direct-coupled devices 51 to 54 as operation targets of these switches are connected to the collective switch apparatus 30 without interposing an apparatus that performs determination processing by using certain information. As in the above-described embodiment, even with the direct-coupled devices 51 to 54, in a case where setting is performed to enable the vehicle body controller 60 to directly control any of the direct-coupled devices 51 to 54 in accordance with the vehicle state, it is possible to achieve control of activating any function of the direct-coupled devices 51 to 54 by the vehicle body controller 60.

Note that the assignment of the functions to the switches SW1 to SW12 is merely an example, and assignment of functions different from the assignment described above is allowable. In this case, however, at least one of the direct-coupled devices 51 to 54 directly coupled without interposing the in-vehicle network N is to be connected to the collective switch apparatus 30 and at least one of the switches SW1, SW2, SW7, and SW8 that activates the functions of the direct-coupled devices 51 to 54 is to be mixed in the switch operation unit SW.

In the present embodiment, in implementation of the collective switch apparatus including the switches for operating the direct-coupled devices, a switch control processing for direct-coupled devices is to be executed without interposing an in-vehicle network. In addition, the collective switch apparatus is also capable of executing switch control processing via the in-vehicle network by mixing switches for executing devices and functions needing vehicle information. This makes it possible to suppress the processing load on the vehicle body controller 60 even when there is a need to provide a large number of switches to activate functions and devices needed for the work vehicle, leading to achievement of execution of various functions without a need to prepare the vehicle body controller 60 with high-performance processing capabilities.

Moreover, in the present embodiment, the switch control processing toward the direct-coupled devices 51 to 54 is not merely executed by the operation of the switches SW1, SW2, SW7, and SW8, but also executed by functions of the direct-coupled devices 51 to 54 activated by the vehicle body controller 60 via the in-vehicle network N depending on the setting of the switch assignment information D1. This makes it possible to perform switch control processing while providing various roles and functions to the direct-coupled devices 51 to 54.

The present embodiment is applicable not solely to a wheel loader as a work vehicle but also to other work vehicles such as bulldozers, excavators, and dump trucks.

REFERENCE SIGNS LIST

1 WHEEL LOADER
2 WORK MACHINE
2a BUCKET
2b BOOM
2c BOOM CYLINDER
2d BUCKET CYLINDER
3 VEHICLE BODY
3a FRONT VEHICLE BODY
3b REAR VEHICLE BODY
4 FRONT WHEEL
5 REAR WHEEL
6 REAR FRAME
7 CAB
8 HYDRAULIC OIL TANK
9 ENGINE ROOM
10 COOLING CHAMBER
12 LADDER
20 DRIVER SEAT
21 STEERING WHEEL
22 WORK MACHINE LEVER
23 CONSOLE
24 PILLAR
30, 30a, 30b COLLECTIVE SWITCH APPARATUS
31 CONTROL UNIT
32 DRIVE SIGNAL OUTPUT UNIT
33 NETWORK SIDE SIGNAL OUTPUT UNIT
34 NETWORK SIDE SIGNAL INPUT UNIT
35, 65 MEMORY
41 to 44 RELAY SWITCH
51 to 54 DIRECT-COUPLED DEVICE
60 VEHICLE BODY CONTROLLER
71 SENSOR GROUP
72 ACTUATOR GROUP
D1 SWITCH ASSIGNMENT INFORMATION
D2 DIRECT-COUPLED DEVICE ORIENTED SWITCH STATE INFORMATION
D3 SWITCH STATE INFORMATION
I1 to I12 INDICATOR
L SIGNAL LINE
N IN-VEHICLE NETWORK
SW SWITCH OPERATION UNIT
SW1 to SW12 SWITCH
T1, T2 CONNECTOR

The invention claimed is:

1. A work vehicle collective switch apparatus comprising:
a switch operation unit including a plurality of switches;
a network side signal output unit that outputs a switch state signal to an in-vehicle network side connected to the collective switch apparatus;
a drive signal output unit that outputs a drive signal to a direct-coupled device connected to the collective switch apparatus, and
a control unit that outputs a command signal corresponding to switch operation on a basis of switch assignment information that assigns in advance as to whether the drive signal is to be output from the drive signal output unit or the switch state signal is to be output from the network side signal output unit in accordance with switch operation of any of the plurality of switches.

2. The work vehicle collective switch apparatus according to claim 1, wherein at least a switch that causes the drive signal output unit to output the drive signal is assigned a function which does not need a vehicle information, and a switch that causes the network side signal output unit to output the switch state signal is assigned a function which needs the vehicle information.

3. The work vehicle collective switch apparatus according to claim 2, wherein at least a switch that outputs the drive signal from the drive signal output unit is provided for activating a function of a lighting device system of the work vehicle.

4. The work vehicle collective switch apparatus according to claim 2, wherein at least a switch that outputs the switch state signal to the in-vehicle network side is provided for executing a work capacity change function of the work vehicle.

5. The work vehicle collective switch apparatus according to claim 1, comprising
a network side signal input unit that inputs a signal from the in-vehicle network side,
wherein, in a case where the signal input via the network side signal input unit is a command signal toward the direct-coupled device, the control unit outputs a drive signal corresponding to the command signal from the drive signal output unit to the direct-coupled device.

6. The work vehicle collective switch apparatus according to claim 5, comprising
a memory that retains a current operation state for the direct-coupled device corresponding to the drive signal,
wherein, in a case where the signal input via the network side signal input unit is a command signal toward the direct-coupled device, and a drive signal corresponding to the command signal is to be output from the drive signal output unit, the control unit updates the switch state retained in the memory.

7. A work vehicle equipped with a collective switch apparatus comprising:
a vehicle body controller connected to the work vehicle collective switch apparatus according to claim 5,
wherein the collective switch apparatus outputs a switch state signal to activate a function of the direct-coupled device to the vehicle body controller in accordance with switch operation of any of the plurality of switches, and
the vehicle body controller outputs a command signal corresponding to the switch state signal to the network side signal input unit based on a determination of the vehicle body controller.

* * * * *